P. A. McCULLOUGH.
TROLLEY HARP.
APPLICATION FILED AUG. 30, 1909.

1,026,689.

Patented May 21, 1912.

WITNESSES
Stephen Wach
Jas. J. Weldon

INVENTOR
Peter A. McCullough.
By Fred'k W. Winter
Attorney

UNITED STATES PATENT OFFICE.

PETER A. McCULLOUGH, OF PITTSBURGH, PENNSYLVANIA.

TROLLEY-HARP.

1,026,689.  Specification of Letters Patent.  Patented May 21, 1912.

Application filed August 30, 1909. Serial No. 515,205.

*To all whom it may concern:*

Be it known that I, PETER A. McCULLOUGH, a resident of Pittsburgh, in the county of Allegheny and State of Pennsylvania, have invented a new and useful Improvement in Trolley-Harps, of which the following is a specification.

This invention relates to what is known as trolley harps, or frames in which the trolley wheel is mounted on the end of the trolley pole.

The object of the invention is to provide a harp or trolley wheel frame of simple and cheap construction, which provides for lubricating the wheel, in which the worn parts can be readily renewed, and one which will prevent the trolley wire from wedging between the wheel and frame.

The invention comprises the construction and arrangement of parts hereinafter described and claimed.

Figure 1:
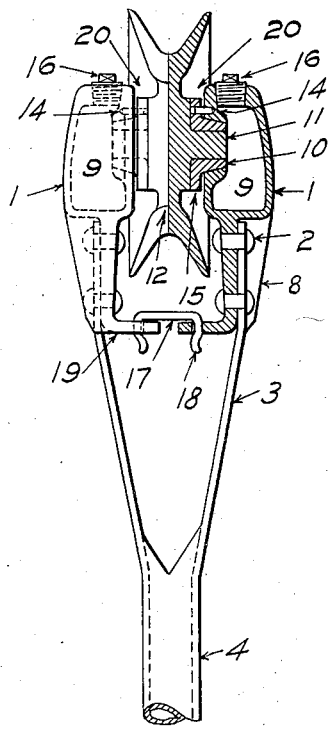
Figure 2:
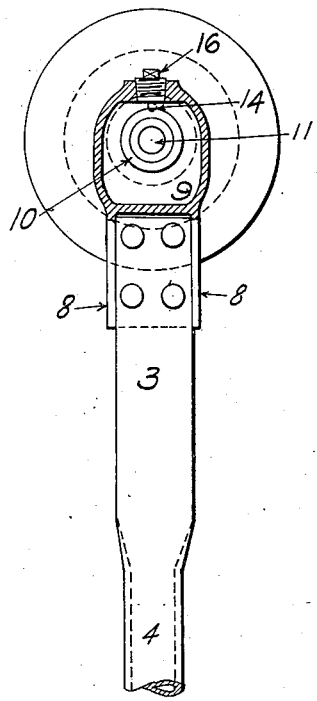
Figure 3:
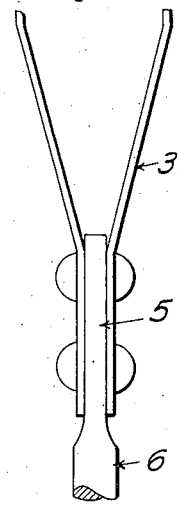
Figure 4:
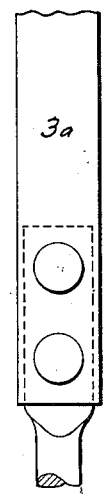

In the accompanying drawing, Figure 1 is in part an end elevation and in part a transverse vertical section of the device; Fig. 2 is a side elevation thereof with a portion in vertical section; and Figs. 3 and 4 are views similar to Figs. 1 and 2 showing a modification.

The harp comprises a pair of similar castings 1 or the like secured by means of rivets 2 or other suitable means to the ends of the spring arms 3 forming the fork of the harp. These spring arms 3 preferably are formed as shown in Figs. 1 and 2 by splitting a section of seamless steel tubing longitudinally for a portion of its length and flattening the split portions to form the arms and having the unslit portion 4 forming a socket for securing the harp to the usual pin or bar on the trolley pole. If desired, the spring arms may be separate flat bars of steel as shown at 3ª, Figs. 3 and 4, riveted at their upper ends to the castings 1 and at their lower ends to a flattened portion of a forging or the like 6 adapted to enter the upper end of a tubular trolley pole.

The castings 1 at their lower portions are formed as webs 7 to which the spring arms are riveted and having strengthening flanges 8 at the side edges of said webs. The upper portions of the castings are provided with oil reservoirs 9 whose inner or facing walls are provided with openings in which are seated the bushings or bearings 10 for receiving the journals 11 of the trolley wheel 12, said journals preferably being integral with the wheel as shown. The bushings are preferably tapered and have a close fit in the openings in the castings and are held against rotation by any suitable means, such as pins 14 entering holes in the casting and in flanges 15 on the bushings. The flanges 15 have their inner faces finished and bearing against the finished end faces of the wheel hub to limit the sidewise play of the wheel. The castings are supplied with threaded openings for the oil supply, said openings being closed by plugs 16.

The wheel 12 is placed in its bearing by springing the arms 3 apart. To prevent the arms from accidentally springing apart, it is desirable to provide a suitable lock or retainer. This is shown as a small bar or the like 17 having curved resilient ends 18 adapted to enter holes in flanges 19 on the lower ends of the castings 1. The curved form of the end portions 18 of this bar prevent accidental disengagement thereof, while the resilient feature permits the same to be withdrawn when necessary.

The wheel 12 is dished on its side faces as usual and the upper parts of the castings 1 project into the dished portions so that the peripheral portion of the wheel slightly overhangs the casting 1 as shown at 20. Consequently, it is not possible for the trolley wire to get between the wheel and its frame and wedge therein. The outer faces of the castings 1 are somewhat curved or rounded as shown in Fig. 1 to enable them to more readily pass the trolley wire.

The trolley harp or wheel frame is of simple, cheap and durable construction. The journals and bearings are the only parts subject to material wear, and these can be readily replaced without discarding the other parts. The device provides for the thorough lubrication of the bearings in a manner to require attention only at long intervals, the reservoirs 9 being of ample size to hold enough oil to last for a considerable time. Said reservoirs will be filled with waste which acts as a wick to feed the oil to the bearings from the bottom portions of the reservoirs.

What I claim is:

1. A trolley comprising a fork consisting of flat spring arms integral with a tubular socket, said socket and arms being of metal of substantially the same thickness, one-piece members provided with oil reservoirs and bearings for the wheel journals rigidly secured to the ends of said spring arms, and a trolley wheel having journals immovable with respect thereto and projecting into said bearings.

2. A trolley comprising a fork having flat spring arms, one-piece members provided with oil reservoirs and bearings for the wheel journals riveted to the free ends of said arms, means arranged to prevent said spring arms from spreading, and a trolley wheel having journals immovable with respect thereto and projecting into said bearings.

3. A trolley harp comprising a pair of members provided with oil reservoirs and having tapered openings in their facing walls, tapered bearing bushings secured in said openings, a trolley wheel journaled in said bushings, and a fork having spring arms to which said members are riveted.

4. A trolley harp comprising a pair of castings provided with oil reservoirs and with openings in their facing walls, bearing bushings secured in said openings and held against rotation, a trolley wheel journaled in said bushings, and a fork having spring arms riveted to said castings.

5. A trolley harp comprising a fork formed from a steel tube split from one end and spread apart to form spring arms united to a tubular socket, members provided with oil reservoirs and bearings for the wheel journals secured to the free ends of said arms, and means connecting said last named members and arranged to prevent said spring arms from separating.

In testimony whereof, I have hereunto set my hand.

PETER A. McCULLOUGH.

Witnesses:
C. F. YOUNG,
JAS. L. WELDON.

---

Copies of this patent may be obtained for five cents each, by addressing the "Commissioner of Patents, Washington, D. C."